United States Patent
Hawkins et al.

(10) Patent No.: US 8,694,352 B1
(45) Date of Patent: Apr. 8, 2014

(54) SYSTEM AND METHOD FOR PROVIDING HANDHELD FIELD FORCE DATA GATHERING AUTOMATION IN A BIG BOX RETAIL ENVIRONMENT

(75) Inventors: Stan Hawkins, Snellville, GA (US); Joe Maranville, Roswell, GA (US); Nick Steele, Powder Springs, GA (US)

(73) Assignee: Reflexis Systems, Inc., Needham, MA (US)

( * ) Notice: Subject to any disclaimer, the term of this patent is extended or adjusted under 35 U.S.C. 154(b) by 364 days.

(21) Appl. No.: 12/218,040

(22) Filed: Jul. 10, 2008

Related U.S. Application Data

(63) Continuation of application No. 10/421,639, filed on Apr. 22, 2003, now abandoned.

(51) Int. Cl.
G06Q 10/00 (2012.01)
G06F 7/00 (2006.01)
G06F 17/30 (2006.01)

(52) U.S. Cl.
USPC .......................................... 705/7.15; 707/722

(58) Field of Classification Search
None
See application file for complete search history.

(56) References Cited

U.S. PATENT DOCUMENTS

| | | | |
|---|---|---|---|
| 5,032,083 A * | 7/1991 | Friedman | 434/112 |
| 5,644,723 A | 7/1997 | Deaton et al. | |
| 5,677,955 A | 10/1997 | Doggett et al. | |
| 5,737,701 A | 4/1998 | Rosenthal et al. | |
| 5,774,551 A | 6/1998 | Wu et al. | |
| 5,794,259 A | 8/1998 | Kikinis | |
| 5,815,665 A | 9/1998 | Teper et al. | |
| 5,855,007 A | 12/1998 | Jovicic et al. | |
| 5,872,850 A | 2/1999 | Klein et al. | |
| 5,911,141 A | 6/1999 | Kelley et al. | |
| 5,938,721 A * | 8/1999 | Dussell et al. | 701/211 |
| 5,983,208 A | 11/1999 | Haller et al. | |
| 6,005,939 A | 12/1999 | Fortenberry et al. | |
| 6,052,710 A | 4/2000 | Saliba et al. | |

(Continued)

FOREIGN PATENT DOCUMENTS

WO    WO 01/46783    6/2001

OTHER PUBLICATIONS

Laurie Peach (Aug. 1998). What'cha gonna do' police vest tracks criminal activity. Design News, 53(16), 23. Retrieved Dec. 29, 2007, from Research Library database. (Document ID: 33348824).*
Business Editors & Technology Writers. (Nov. 30). Quicksheet Now Integrates With ImagiWorks' Data-Collection Line of Products for Palm OS Devices. Business Wire,1. Retrieved Jul. 31, 2010, from Business Dateline. (Document ID: 46744448).*
Internet Archive of FieldWorker.com (The Leading Edge in Mobile Data Collection Software, 2002) http://www.fieldworker.com.*

(Continued)

*Primary Examiner* — Jonathan G Sterrett
*Assistant Examiner* — Folashade Anderson
(74) *Attorney, Agent, or Firm* — Smith Risley; Steven P. Wigmore

(57) ABSTRACT

The present invention provides systems and methods for tracking service representative activity and data. Service representatives are equipped with handheld devices that are configured to execute question and instruction sequences during a service call. Worksheets containing such surveys and instruction sequences may be periodically transmitted to the handheld device from a backend server. The handheld device records the times at which the service representative enters and exits a retail location and the times at which particular tasks are started and completed. The worksheets allow service representatives to enter relevant data into the handheld device. Such data may include digital images, signatures and the like. All data collected at the handheld devices may be transmitted via a network or other communication link to a secure backend server, where it stored in a database and made available for query by a reporting module.

10 Claims, 20 Drawing Sheets

(56) References Cited

U.S. PATENT DOCUMENTS

| | | | |
|---|---|---|---|
| 6,073,106 A | 6/2000 | Rozen et al. | |
| 6,125,352 A | 9/2000 | Franklin et al. | |
| 6,125,356 A * | 9/2000 | Brockman et al. | 705/37 |
| 6,151,581 A * | 11/2000 | Kraftson et al. | 705/3 |
| 6,154,768 A | 11/2000 | Chen et al. | |
| 6,192,380 B1 | 2/2001 | Light et al. | |
| 6,199,079 B1 | 3/2001 | Gupta et al. | |
| 6,208,659 B1 | 3/2001 | Govindarajan et al. | |
| 6,233,608 B1 | 5/2001 | Laursen et al. | |
| 6,243,688 B1 | 6/2001 | Kalina | |
| 6,247,029 B1 | 6/2001 | Kelley et al. | |
| 6,253,203 B1 | 6/2001 | O'Flaherty et al. | |
| 6,298,347 B1 * | 10/2001 | Wesley | 707/10 |
| 6,321,339 B1 | 11/2001 | French et al. | |
| 6,356,905 B1 * | 3/2002 | Gershman et al. | 707/10 |
| 6,385,596 B1 | 5/2002 | Wiser et al. | |
| 6,401,085 B1 | 6/2002 | Gershman et al. | |
| 6,491,217 B2 | 12/2002 | Catan | |
| 6,571,279 B1 | 5/2003 | Herz et al. | |
| 6,571,285 B1 | 5/2003 | Groath et al. | |
| 6,584,448 B1 | 6/2003 | Laor | |
| 6,665,704 B1 | 12/2003 | Singh | |
| 6,725,050 B1 | 4/2004 | Cook | |
| 6,845,370 B2 | 1/2005 | Burkey et al. | |
| 6,971,063 B1 * | 11/2005 | Rappaport et al. | 715/733 |
| 7,003,434 B2 * | 2/2006 | Azpitarte | 702/184 |
| 7,428,419 B2 * | 9/2008 | Wetzel et al. | 455/456.6 |
| 2001/0011250 A1 | 8/2001 | Paltenghe et al. | |
| 2001/0054066 A1 * | 12/2001 | Spitzer | 709/203 |
| 2002/0002684 A1 * | 1/2002 | Fox et al. | 713/200 |
| 2002/0107972 A1 | 8/2002 | Keane | |
| 2002/0141850 A1 * | 10/2002 | Yamada | 414/217.1 |
| 2004/0155109 A1 * | 8/2004 | Kenney et al. | 235/462.45 |
| 2008/0288276 A1 * | 11/2008 | Harris | 705/1 |

OTHER PUBLICATIONS

Microsoft.NET Passport Technical Overview, Sep. 2001, entire article.
Microsoft.NET Passport, "What's New", Sep. 2001, entire article.
Webpage entitled: "Free Password Manager—Store passwords—Desktop or Online", available at www.passwordsafe.com, 1 page.
Secure Your Web Site With Passport, "Implement Passport", *Visual Studio Magazine*, pp. 1-3.
Jon Rauschenberger, Secure Your Web Site With Passport, "Simplify Your Web Site Visitors' Experience by Authenticating Them", *Visual Studio Magazine*, pp. 1-3.
Secure Your Web Site With Passport, "Sign in, Please", *Visual Studio Magazine*, pp. 1-3.
Secure Your Web Site With Passport, "Passport Key to HailStorm's Success", *Visual Studio Magazine*, pp. 1-2.
*Implementing Mobile Passport*, pp. 1-5.
Webpage entitled: "Zkey—Corporate", available at www.zkey.com, 1 page.
Alan Cohen and Walaika Haskins, "Grab-and-Go Web", *PC Magazine*, Oct. 19, 2000, pp. 1-3.
Webpage entitled: "LinkUall.com—Products—Calendars and Address books", available at www.linkuall.com, pp. 1-2
Webpage entitled: "LinkUall.com—About Us—LinkUall Technology", available at www.linkuall.com, 1 page.
Microsoft PressPass, *Microsoft.NET*: "A Platform for the Next Generation Internet", Jun. 22, 2000, pp. 1-7.
Microsoft Press Release. "Microsoft Passport Offers Streamlined Purchasing Across Leading Web Sites", Oct. 11, 1999, pp. 1-4.
Graeme Bennett, *PC Buyer's Guide.com*, (updated Jun. 22, 2000), "NGWS—Microsoft's Dot Net Strategy", pp. 1-5.
Webpage entitled: "Microsoft's Passport: A single name, password and wallet for the web," available at www.passport.com, pp. 1-2.
Webpage entitled: "Microsoft's Passport *Member Services*, What is Passport", available at www.passport.com, pp. 1-12.
Webpage entitled: "Microsoft's Passport: Streamlining Commerce and Communication on the Web", available at www.passport.com, Oct. 11, 1999, pp. 1-3.
Webpage entitled: "Online Businesses Use Microsoft Passport Single Sign-In and Wallet Services to Provide Customers with Secure and Convenient Shopping", available at www.microsoft.com, May 17, 2000, pp. 1-2.
Garry Gunnerson, "EZ Login", *PC Magazine*, pp. 1-2, Mar. 14, 2000.
"Ezlogin.Com Introduces Liveclips, Enabling Net Users to Clip Content from Anywhere on the Web and Paste it on a Custom page", Java Industry Connection, Mar. 8, 2000, pp. 1-2.
Webpage entitled: "724 Solutions—Products—Wireless Internet Platform", available at www.724.com , pp. 1-3.
Webpage entitled: "724 Solutions—Products—m-Commerce", available at www.724.com, pp. 1-4.
Webpage entitled: "724 Solutions—Products—Financial Services", available at www.724.com, 1 page.
Gator Press Release. "Gator.Com Delivers on the Promise of the Electronic Commerce Modeling Language (ECML) Standard Today: Gator offers one-click shopping at over 5,000 e-commerce sites today", Jun. 14, 1999, pp. 1-2.
Gator Press Release. "Internet Start-up Gator.com Introduces Gator, the Web's First Smart Online Companion: New Internet product offers one-click login and express registration and checkout across the web", Jun. 14, 1999, pp. 1-3.
Gator Press Release. "Gator Helps Consumers at More than 25,000 E-Commerce and Registration Sites in First Month of Usage: Software an invaluable companion for more than 80,000 online consumers", Aug. 3, 1999, pp. 1-2.
Webpage entitled: "Affiliate Application" *How do Gator, Price Helper, and OfferCompanion Work?*, available at www.gator.com, 1 page.
Webpage entitled: "Yodlee: e-Personalization Solutions", available at www.yodlee.com, pp. 1-2.
Webpage entitled: "Yodlee: e-Personalization Platform", available at www.yodlee.com, 1 page.
Webpage entitled: "Yodlee: e-Personalization Applications", available at www.yodlee.com, 1 page.
Webpage entitled: "Yodlee for Web: One-Click Access to All Personal Accounts", available at www.yodlee.com, 1 page.
Webpage entitled: "Yodlee for Mobile: Simplify Your Life on the Road with Yodlee2Go", available at www.yodlee.com, 1 page.
Webpage entitled: "Yodlee2Go: Palm OS Wireless", available at www.yodlee.com, 1 page.
Webpage entitled: "Yodlee2Go: Web-enabled Phones", available at www.yodlee.com, 1 page.
Webpage entitled: "Security Overview", available at www.yodlee.com, pp. 1-2.
Webpage entitled: "Co-Brand Partner Opportunities", available at www.yodlee.com, pp. 1-2.
Webpage entitled: "Content Partner Opportunities", available at www.yodlee.com, 1 page.
Webpage entitled: "Sweet Enonymity", available at www.enonymous.com, pp. 1-2.
Webpage entitled: "Vision for an Enonymous Infomediary", available at www.enonymous.com, pp. 1-3.
Webpage entitled: "Learn More", available at www.digitalme.com, pp. 1-2.
Webpage entitled: "Take Control", available at www.digitalme.com, pp. 1-2.
Webpage entitled: "Make it Convenient", available at www.digitalme.com, pp. 1-3.
Webpage entitled: "Create Relationships", available at www.digitalme.com, pp. 1-2.
Webpage entitled: "FAQ", available at www.digitalme.com, pp. 1-2.
Webpage entitled: "Digitalme™ Fact Sheet (www.digitalme.com)", available at www.digitalme.com, pp. 1-3.
"Choicepoint Unveils New Web-based Pre-employment Screening Service", BusinessWire p. 1287, May 17, 1999.

\* cited by examiner

Fig. 3-2

- Start  6:58a  ok
- Welcome Shannon Boling!
- Please make a selection
- 304 → Start Call
- 305 → Finalize Work Sheets
- 306 → Synchronize
- 307 → Log Out
- New Tools

Fig. 3-3

PACE  6:58a  ok
Store Information

- Store: Lowes — 308
- Store #: 571  All — 329, 309
- Manager: James Brown — 310
- Asst. Manager: Ken Stewart — 311
- Prev    Next
- New Tools

Fig. 3-4

Start  6:58a  ok
Select Vendor

| Name | Number | |
|---|---|---|
| Generac Power Set | 37994 | |
| Reliabilt | 21008 | |
| Hound Dog | 18797 | |
| Imperial Schrade | 378886 | ▲ |

311 → Reliabilt

Reliabilt           21008
Department:    Dept. Manager:
D25                 Mike Meyers 313 → Sheet Type Call Sheet
| Reset Worksheet | |
| Pk Sheets | |
| RTV Sheets | |

New Tools

Fig. 3-5

PACE  6:58a  ok
Take "Pre-Serviced Set Picture" Now — 315 view/edit answer

Is Set to Minimum Standards?
○ Yes  ○ No
view/edit answer — 316

Is POP up?
○ Yes  ○ No
view/edit answer — 317

Vendor #: 21008      Call Sheet
Vendor: Reliabilt
◀ Prev   Date: 9/25/01   Next ▶
New Tools

Fig. 3-10

PACE    6:58a (ok)

Q: Is Set to Minimum Standards? = No

Q: Explain . . = Will be set on the following date

[Cancel] [Done]   326

Enter Date: . . .

11/11/01 ▼

New Tools

PACE    6:58a (ok)

Q: Is POP up? = No

[Cancel] [Done]   328

Explain . . .

| ▼ |
|---|
| Will not work at this store |
| Store took down |
| Store damaged |
| Other |

New Tools

PACE    6:58a (ok)

Q: Is POP up? = No

Q: Explain . . = Store took down

[Cancel]

Order Missing POP #s Now: . . .

[POP Order Form]

New Tools

PACE    6:58a (ok)

POP Order Form

| Qty | Item # | Description | ▼ |
|-----|--------|-------------|---|
|  | G902-191 | GCG 350L-1 |  |
|  | G902-193 | GCG 350L-2 |  |
|  | G902-193 | GCG 350L-2Wk |  |
|  | G902-194 | S550-2 |  |
|  | G902-195 | SD990-2 |  |
|  | G902-196 | SD1000-2H |  |
|  | G902-181 | GCG 350L-1 |  |
|  | G902-182 | GCG 350L-2 |  |
|  | G902-183 | GCG 350L-2Wk |  |
|  | G902-184 | S550-2 |  |
|  | G902-185 | SD990-2 |  |
|  | G902-186 | SD1000-2H |  |
|  | G902-187 | ProInstall What to look to |  |
|  | G902-188 | Excelerator Advantages | ▲ |

[Cancel] [Done]

New Tools

PACE — 6:58a — ok

Q: Is the date of last beam label within 12 weeks of today's date? = No

[Cancel] [Done]

Explain:
- Beam Labels were changed
- Mobile cart not available
- Not enough time
- Other New Tools

Fig. 3-15

PACE — 6:58a — ok

Q: Is the date of last beam label within 12 weeks of today's date? = No

Q: Explain . . = Mobile cart no available

[Cancel] [Done]

What is the current label date?

New Tools

Fig. 3-16

PACE — 6:58a — ok

Q: Is the date of last beam label within 12 weeks of today's date?

O Yes   O No

How big is the set?

[ 16 ft ▼ ]

Are all current units on display?:

O Yes   O No

Vendor #: 21008     Call Sheet
Vendor: Reliabilt
◀ Prev   Date: 9/25/01   Next ▶

New Tools

Fig. 3-17

PACE — 6:58a — ok

Take a Set Picture Now

[view/edit answer]

Are Products Cross Merchandised?
O Yes   O No

[view/edit answer]

Would you like to add any comments?
O Yes   O No

[view/edit answer]

Vendor #: 21008     Call Sheet
Vendor: Reliabilt
◀ Prev   Date: 9/25/01   Next ▶

New Tools

Fig. 3-26

PACE  6:58a (ok)

Q: Would you like to add any comments? = Yes

[Cancel] [Done]

Our team is great

New Tools

Fig. 3-27

PACE  6:58a (ok)

Estimate the amount of time spent servicing the vendor

- < 15 min.
- 15 – 30 min.
- 30 – 45 min
- 45 min – 1 Hour
- 1 Hour – 1 Hour Fifteen min.
- 1 Hour Fifteen – 1 Hour Thirty min Vendor #: 21008  Call Sheet
Vendor: Reliabilt
[◀◀ Prev]  Date: 9/25/01  [Next ▶▶]

New Tools

Fig. 3-28

PACE  6:58a (ok)

Estimate the amount of time spent servicing the vendor

— 350

Call Sheet Complete (?) Call Sheet Complete! If you are satisfied with your answers choose Ok to continue.

[OK] [Cancel]

Vendor #: 21008  Call Sheet
Vendor: Reliabilt
[◀◀ Prev]  Date: 9/25/01  [Next ▶▶]

New Tools

Fig. 3-29

PACE  6:58a (ok)

Select Vendor

Name | Number
Adjustable Clamp | 15717
Amt
And   PACE unit
Atha
Blue  Is rtv mgr still the
Build Dept Manager?
Adj                        5717
D    [YES]  [NO]         er:

— 352

Sheet Type
RTV

[◀◀ Prev]  [Main Menu]  [Next ▶▶]

New Tools

Fig. 3-30

PACE — 6:58a — ok
Did you process RTV for this vendor?
○ Yes   ○ No
view / edit answer
Estimate the amount of time spent servicing the Vendor.
[dropdown]
Vendor #: 15717    RTV
Vendor: *Adjustable Clamp*
◀◀ Prev   Date: 9/25/01   Next ▶▶
New Tools

Fig. 3-31

PACE — 6:58a — ok
Did you process RTV for this vendor?
Indicate how RTV's were processed:
[Cancel] [Done] [View]
Inspected – Field Destroy ▼
New Tools

Fig. 3-32

PACE — 6:58a — ok
Did you process RTV for this Vendor?
PACE unit
? RTV Complete! If you are satisfied with your answers choose Ok to continue.
[OK] [Cancel]
Vendor #: 15717    RTV
Vendor: *Adjustable Clamp*
◀◀ Prev   Date: 9/25/01   Next ▶▶
New Tools

Fig. 3-33

PACE — 6:58a — ok
Indicate the type of PK given.
Informal PK ▼
Did you explain the value and use of the product?
● Yes   ○ No
Did you explain Product Safety?
● Yes   ○ No
Vendor #: 46900    PK Sheet
Vendor: *Ambrand / Amdro*
◀◀ Prev   Date: 9/25/01   Next ▶▶
New Tools

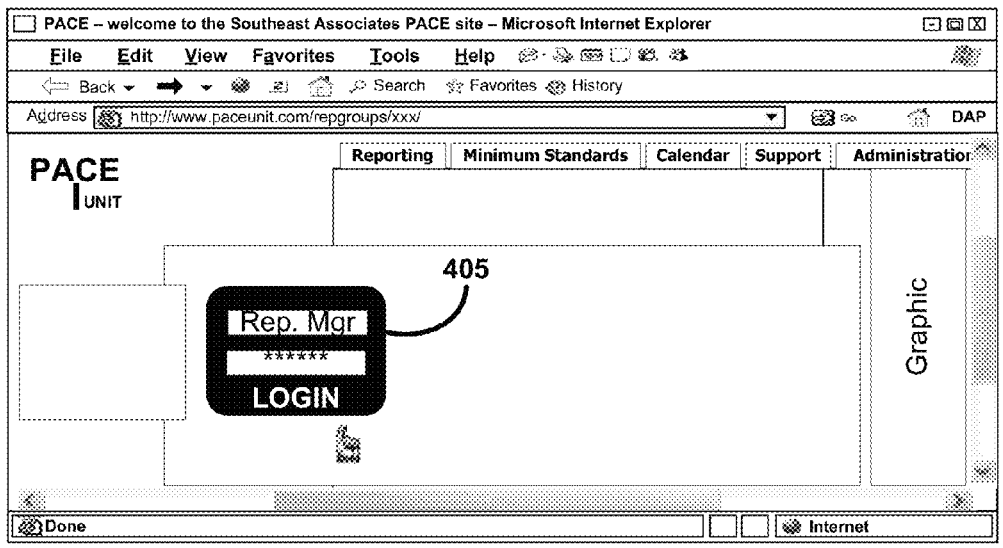
Fig. 4-1
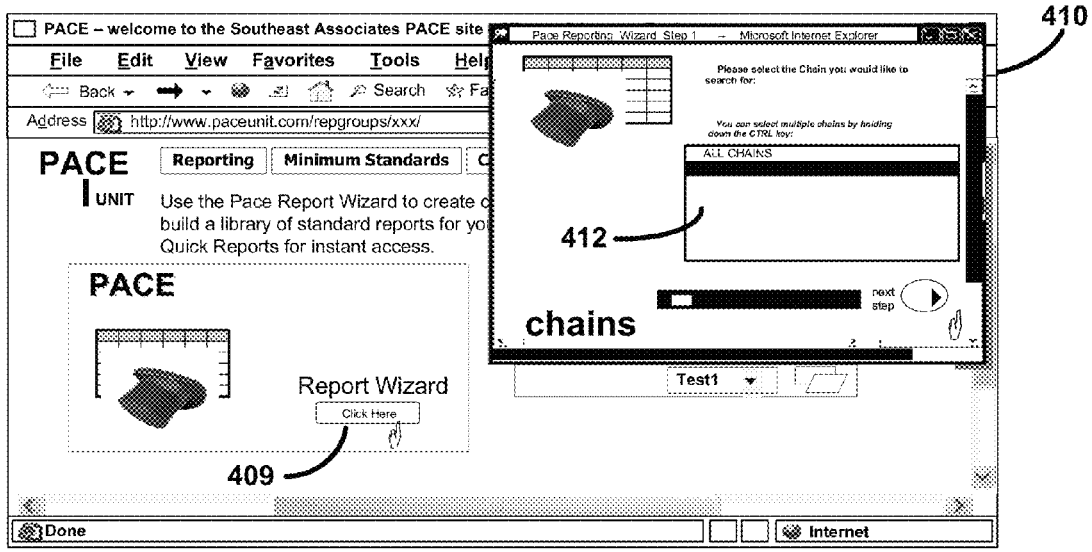
Fig. 4-2
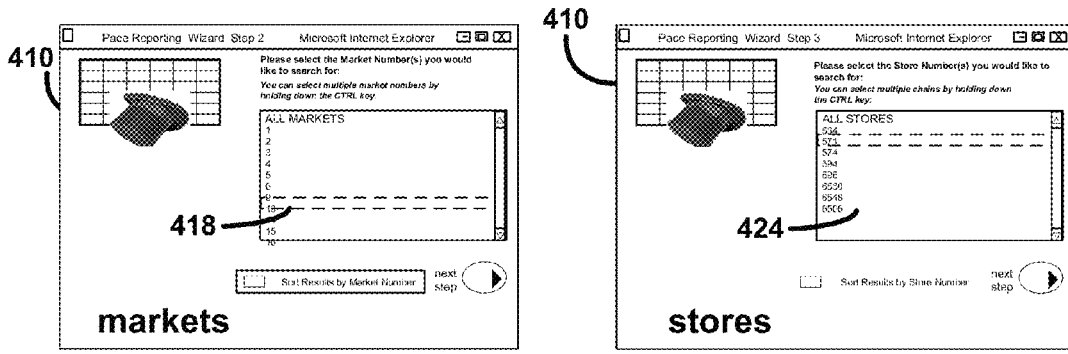
Fig. 4-3
Fig. 4-4

SYSTEM AND METHOD FOR PROVIDING HANDHELD FIELD FORCE DATA GATHERING AUTOMATION IN A BIG BOX RETAIL ENVIRONMENT

STATEMENT REGARDING RELATED APPLICATIONS

The application is a continuation of and claims priority to application Ser. No. 10/421,639 filed Apr. 22, 2003 now abandoned, entitled "Systems and Methods for Providing Field Force Automation in Big Box Retail Environments," the entire contents of which is incorporated by reference.

FIELD OF THE INVENTION

The present invention relates generally to field force automation. More particularly, the present invention relates to systems and method for enabling vendor service representatives to capture data in a retail center using a handheld computing device and to synchronize the handheld computing device with a secure server that can be accessed by the service representative agency, the vendor and/or the retailer for data analysis and reporting.

BACKGROUND

Big box retail centers typically range in size from 90,000 to 200,000 square feet and use a windowless box store design with a single-floor layout. Well known examples of big box retailers include Home Depot, Lowe's, Toys "R" Us, Circuit City, Crown Books, Office Depot, Sports Authority and Builders Square. These and other big box retailers are known as "category killers" because they are large niche retailers that buy and sell huge volumes of merchandise at low prices in a particular product category. The category killer retail model depends on high-volume sales rather than price markups.

In an attempt to avoid price markups, category killer big box retailers will usually eliminate middlemen and deal directly with product vendors. These big box retailers typically agree to allow vendor services representatives to pay regular visits to the retail stores. The service representatives work with store management to negotiate such things as the location, presentation and price of the vendor's products. Service representatives also sell product lines, place orders for additional products, manage defective or broken products, ensure that the proper advertising and signage is in place, etc. In general, service representative do whatever it takes to ensure that the vendor's products are selling at desired performance levels.

Many service representatives are employed by a service representative agency. The agency may have contracts to represent vendors in particular regions. The agency may divide its regions into territories that are assigned to the service representatives. A service representative will often represent multiple vendors within a given territory. Often times, a service representative will service multiple vendors in a single big box retail center.

Data collected by service representatives is currently complied on paper forms (e.g., "Call Sheets"). These paper forms are typically mailed or faxed to the vendor, who analyzes the data and generates reports. The paper-based system involves many inefficiencies, most notably the delay involved in transmitting the paper forms to the vendor and the processing time for extracting and compiling data from the paper forms to be input into a report. In addition, the paper-based system does not provide a convenient mechanism for verifying the dates, times and durations of service calls. Thus, service representative accountability is often in question.

Accordingly, there remains a need for a system and method of providing service representation that would enable organizations to reduce cost of operations, increase productivity of their mobile field forces and drive improved efficiencies throughout.

BRIEF DESCRIPTION OF THE INVENTION

The present invention satisfies the above-described and other needs by providing systems and methods for tracking service representative activity and data in real-time or near real-time. Service representatives may be equipped with handheld devices that are configured with specialized software for assisting the service representative in collecting data during a service call. The specialized software executes surveys and/or instruction sequences that may be custom-designed to meet the service needs of a particular vendor and/or retailer. Surveys and/or instruction sequences may be periodically transmitted to the handheld device from a backend server.

The handheld device may be programmed to automatically record the times at which the service representative enters and exits a retail location (e.g., by communicating with a retailer computer or "beacon" on the premise or a position locator service, such as GPS). Otherwise the service representative may manually input to the handheld device the times at which he or she enters and exits the retail location. Similarly, the times at which particular tasks are started and completed may be recorded (automatically or manually) using the handheld device.

While performing each task during a service call, the service representative may enter data into the handheld device according to questions and instructions that are displayed. The handheld device may conveniently be configured for capturing digital images and signatures, scanning bar codes and/or communicating with retailer devices to receive data. All data collected at the handheld device may be transmitted via a network or other communication link to a secure backend server, where it stored in a database and made available for query by a reporting module. By querying the data, management (service agency, vendor and/or retailer) may generate reports to review and verify the work performed by the service representative and account for the time spent by the service representative doing that work. The reports may also be used by management to track the sales performance of the vendor's products based on the in-store data collected by the service representative.

BRIEF DESCRIPTION OF THE DRAWINGS

FIG. 3-1 thru FIG. 3-44, illustrates exemplary screen displays which provide a demonstration of the functionality of the handheld device in accordance with an exemplary embodiment of the invention.

FIG. 4, comprising FIG. 4-1 thru FIG. 4-18, illustrates an exemplary web-interface for a web-based reporting module of the present invention.

DETAILED DESCRIPTION OF EXEMPLARY EMBODIMENTS

The present invention provides systems and methods for enabling field representatives, such as vendors' service representatives, to collect data during a service call using a handheld computing device. The handheld device may communicate with a secure server via a network in order to upload data and to receive messages, data, software updates, etc. Data uploaded to the secure server may be stored in a database. Vendors, service representative agencies and/or retailers may be provided with permission-based access to the database in order to perform data analysis and reporting functions. The systems and methods of the present invention thus provide vendors, service representative agencies and retailers with real-time (or near-real-time) access to information regarding the sale and presentation of product lines and the performance of the service representatives.

Figure 1:
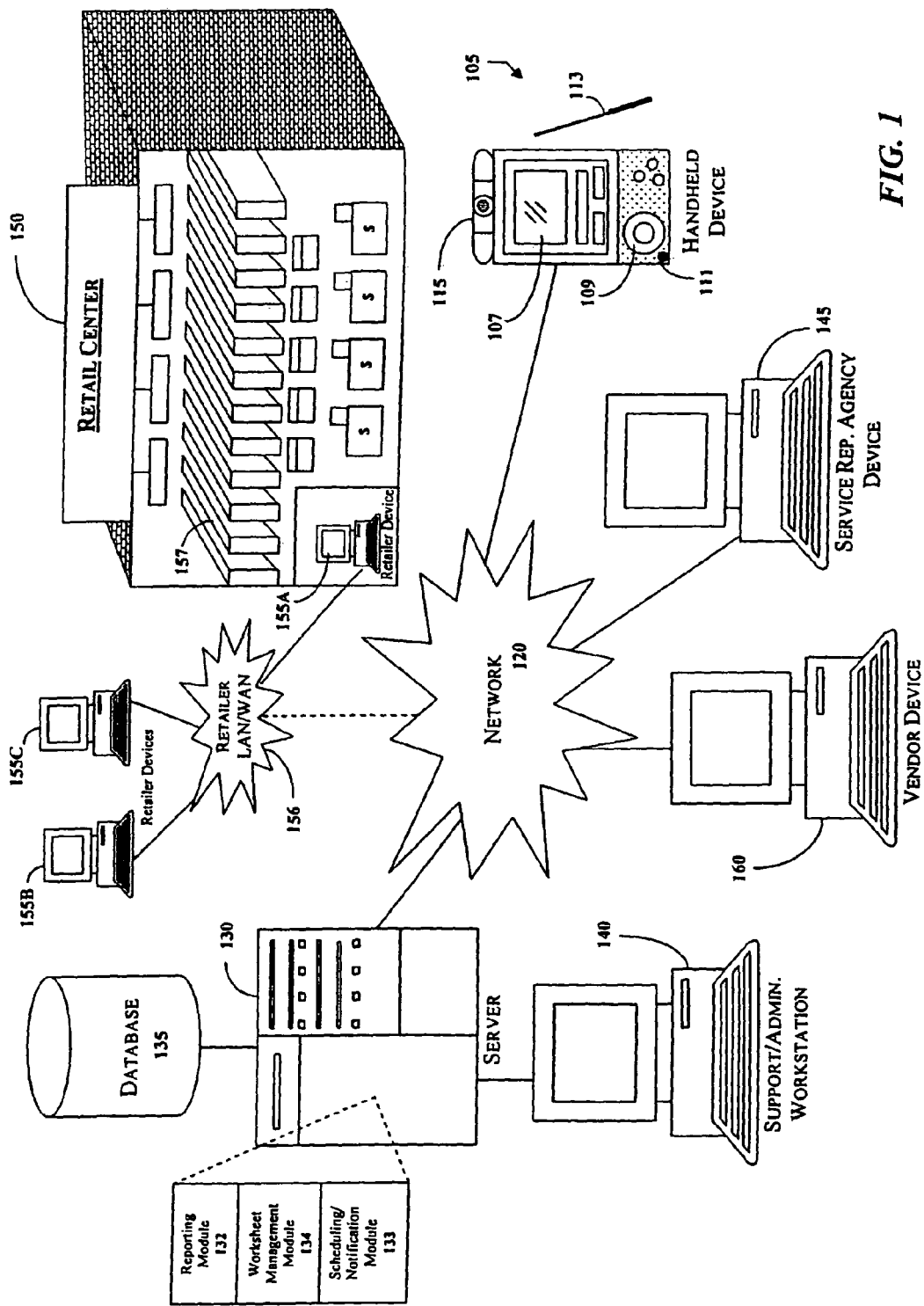
FIG. 1 comprises a block diagram illustrating an exemplary system of the present invention.

Exemplary embodiments of the present invention will hereinafter be described with reference to the drawings, in which like numerals are used to indicate like elements. As shown in FIG. 1, handheld devices 105, a server 130, a workstation 140, service representative agency devices 145, vendor devices 160 and possibly even retailer devices 155A-C may all be interconnected by way of a network 120. Retailer devices 155A-C may be interconnected via a local or wide area network, referred to herein as "retailer LAN/WAN" 156. Retailer devices 155A-C may include computer terminals, POS devices, handheld devices or any other processor-driven devices operated within the retail environment. Likewise, vendor devices 160 and service representative agency devices 145 may include any processor-driven devices that are configured to communicate with the server 130 via the network 120 or a dedicated communications link.

In the environment shown in FIG. 1, data collected at a handheld device 105 by a service representative may be transmitted to the server 130 and may be made instantly (or nearly instantly) available to the other devices connected to the network 120. The server 130 may include or be in communication with a database 135 for storing the data received by the handheld device 105. The database 135 may be configured to store the data in an encrypted format, using a relational data storage model, an object oriented data storage model, a data aggregate storage model (e.g., one or more XML aggregates) or any other suitable data storage model. As one example, vendor devices 160 and/or service representative agency devices 145 may interact with the server 130 via the network 120 using web browser software.

As mentioned, a service representative may use the handheld device 105 to collect data during a service call to a retail center 150 or other location. The service representative may examine one or more product displays 157 and record his/her observations using the handheld device 105. The handheld device 105 of the present invention may be configured with hardware and/or software for receiving and storing various types of data, including text, signatures, images and sounds. By way of illustration only, the handheld device 105 may comprise a Microsoft Windows CE-based device, such as the Casio 'Cassiopeia,' the Dell 'Axim,' etc., a Palm OS-based personal digital assistant (PDA), or any other suitable handheld computing device.

The handheld device 105 may include input/output (I/O) devices, such as a display screen 107, integrated controls (buttons) 109, a camera 115, a scanner, a microphone 111, a speaker, a printer, and the like. The handheld device 105 may be configured with any combination of integrated I/O devices or add-on I/O devices. Add-on I/O devices may be coupled to the handheld device 105 by way of an expansion slot, port, wireless link or other suitable interface. The display screen 107 may be touch-sensitive or motion-sensitive to accept input signals from a pointing device 113, e.g. a stylus, finger, etc.

The communications capabilities of the handheld device 105 may take any well-known or emerging form, such as modem, a network interface card, or the like. The handheld device 105 may also communicate with the network 120 via another computing device, for example if connected to the other computing device by way of a cradle, cable, or other device or wireless connection. The handheld device 105 may thus be configured to communicate with the network 120 via a wireless connection and/or via a wire-line connection. The handheld device 105 may be configured to communicate according to any suitable communication protocol(s).

The handheld device 105 may also be configured to execute software for presenting a service representative with a sequence of instructions and/or interactive surveys ("worksheets"). Instruction sequences and interactive surveys may guide the representative through the tasks that are to be performed on behalf of a vendor. Instruction sequences or interactive surveys may be customized so as to be unique to a particular vendor or type of product. Such instruction sequences or interactive surveys may be periodically modified, updated or changed at the back-end server 130 and may be transmitted from the server 130 to the handheld device 105. As an example, when the service representative uses the handheld device 105 to upload data to the server 130, the server 130 may respond by sending updated software, instruction sequences, interactive surveys or other messages to the handheld device 105.

Figure 2:
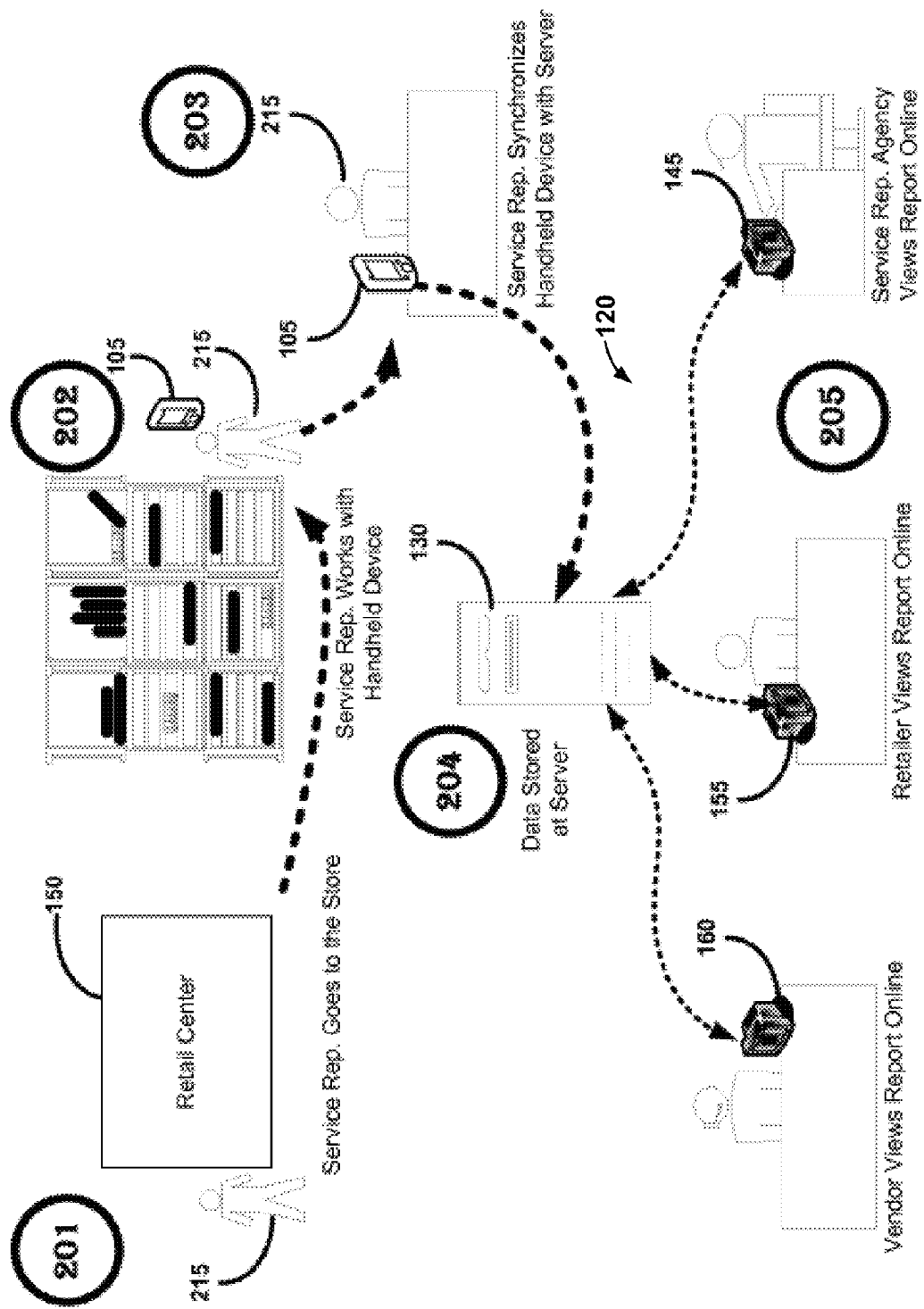
FIG. 2 comprises a block flow diagram illustrating major steps in an exemplary method of the present invention.

FIG. 2 is a block diagram illustrating user interactions with an exemplary system of the present invention. At step 201, a service representative 215 visits a retail center 150 to perform a service call. At step 202, the service representative 215 works with a handheld device 105 to complete certain tasks associated with the service call and to collect data relating to the completion of those tasks. Then at step 203, the service representative 215 synchronizes the handheld device 105 with the server 130. At step 204, the data collected by the service representative 215 is stored at the server 130 and is made available to authorized users for reviewing and reporting. For example, step 205 shows that the data stored in the server 130 may be accessed, for example via the network 120, by vendor personnel using a vendor device 160, retailer personnel using a retailer device 155 and service representative agency personnel using a service representative agency device 145.

Figures 1, 3:
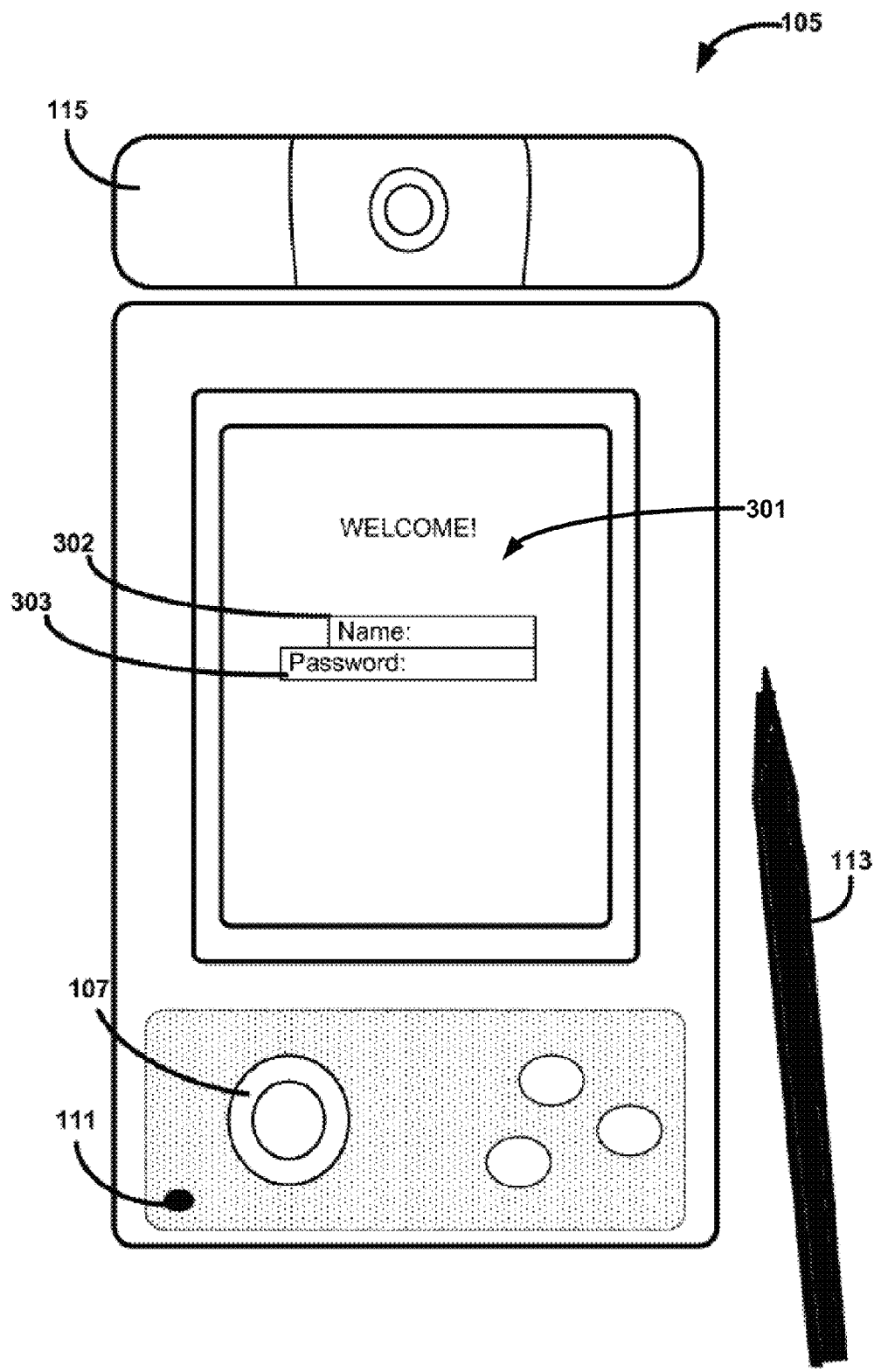
FIG. 3, comprising

FIG. 3, comprising FIG. 3-1 through FIG. 3-44, provides an illustrated demonstration of certain functionality of the handheld device 105 in accordance with an exemplary embodiment of the invention. FIG. 3-1 shows an exemplary login interface of the handheld device 105. The user (e.g., service representative 215) may select his/her name from a pre-populated "Name" list 301 or may otherwise enter his/her name using a stylus 113, integrated controls 109, a microphone 111 or any other integrated or attachable input device. The exemplary login interface may also require that a password be entered into a "Password" field 302 before access to the application is granted. Login information may be submitted for authentication by activating a "Login" icon 303. Authentication of login information may be performed locally at the handheld device 105 or at the server 130. Of course, performing login authentication at the server 130 requires a network connection or other communication link with the server 130. The login time may be recorded by the handheld device 105.

FIG. 3-2 shows an exemplary main menu of choices that may be presented to the user upon successful login. The exemplary main menu includes a "Start Call" icon 304, a "Finalize Work Sheets" icon 305, a "Synchronize" icon 306 and a "Logout" icon 307. The "Start Call" icon 304 is to be activated when the user desires to begin a service call. The time at which the "Start Call" icon 304 is activated may be recorded be the handheld device 105 for reporting and analysis purposes, as will be explained below. Activation of the "Finalize Work Sheets" icon 305, the "Synchronize" icon 306 will be explained below. Activation of the "Logout" icon 307 terminates the application. It will be assumed for the time being that the user activates the "Start Call" icon 304 at this point in the example.

Although not shown in the exemplary main menu, the user could also be presented with additional and/or alternative task choices. For example, another choice may be to resume a service call already in progress. This option would allow a user to suspend a service call for whatever reason, save the data already collect during that service call, and subsequently return to complete the service call without having to re-enter the previously collected data into the call worksheet. As will be explained below, activation of the "Finalize Worksheets" icon 305 may allow the user to review any completed worksheets and attach any required signatures to those worksheets (e.g., signatures of store managers to confirm that service calls were completed.) As an alternative to the "finalize worksheets" choice, the main menu may provide separate choices of "review worksheets" and "attach signatures." This would allow the user to perform on of these two choices without having to step through both processes. These and other additional and/or alternative choices may be presented in the exemplary main menu of FIG. 3-2.

FIG. 3-3 shows an exemplary screen that may be presented to the user upon selection of the "Start Call" icon 304. As shown, the user may interact with a "Store" list 308 and a "Store #" list 309 to select the store and store number, respectively, in which the service call is to take place. The "Store #" list 309 may include all store numbers in a particular division or may be limited to only those store numbers in a territory assigned to the user. In the example shown, the "All" icon 329 positioned adjacent the "Store #" list 309 can be selected to switch from a territory store number list to a division store number list. When the division store number list is active, the label of the "All" icon 329 may be changed to "Mine" or some other phrase to indicate that the user's personal territory store number list is available.

The names of the store manager and assistant manager may be input into a "Manager" field 310 and an "Asst. Manager" field 311, respectively. Store information may also be input using other known interfaces. Valid store names, store numbers, manager names and/or assistant manager names (and any other information presented in a list format) may be stored locally in the memory of the handheld computing device 105 and may be periodically updated through synchronization with the secure server 130. Alternatively, such information may be transmitted to the handheld device 105 from a remote source, such as the server 130 or a retailer device 155A, when the handheld device 105 is detected within the retail center 150 (e.g., utilizing BlueTooth, GPS, or other device locating/detection protocol(s)). Otherwise, it may be left up to the service representative 203 to determine and input a valid store name, store number, manager and/or assistant manager name (or other store associate name).

In another embodiment, the retail center 150 may be equipped with a "beacon" that emits a signal coded with a unique ID of the retail center 150 and the current date and time. The beacon signal may be infrared, UHF, microwave, UWB, or any other suitable digital or analog signal. A beacon may be located at a point of entry and/or at an exit. The handheld device 105 may be configured to detect the infrared signal emitted by the beacon and, in response, automatically initiate the store service call. Automatically initiating the store service call may involve associating the date, time, and store ID of the service call with a worksheet. Other information, such as store managers' names, may also be automatically associated with a worksheet based on the unique ID of the retail center 150.

The beacon's timestamp may be used to synchronize the clock of the handheld device 105. This may help to prevent the service representative from tampering with the clock of the handheld device in order to fabricate times and/or durations of service calls. As further tamper-prevention, the unique ID of the retail center carried by the beacon serves to positively identify the store being serviced, thus eliminating the possibility of "out-of-store" or "store-of-convenience tampering" by the service representative. If the beacon is not detected by the handheld device 105 when the service representative enters the retail center 150, the service representative may initiate the service call manually, as described above, by activating the "Start Call" icon 304 shown in FIG. 3-3.

The beacon may also be used to facilitate an automated store exit process, after the service representative completes the service call and finalizes all worksheets (to be described below). Upon exiting the retail center 150, the handheld device may detect the infrared beacon signal and automatically initiate the store exit process. In certain embodiments, the service call is not considered finalized until the store exit process is completed. The beacon's timestamp is used to indicate the time of service call completion, again preventing device time-tampering by the service representative. Optionally, the beacon signal may be coded with a digital signature, such as a store manager's signature, that can be received by the handheld device 105 and associated with and previously un-signed worksheets and/or used for reporting and proof of store acknowledgement of the service call. Attachment of signatures to worksheets will be described in more detail below. If the beacon is not detected by the handheld device 105 during the store exit process, the user can perform the store exit process manually, as will be described below.

Figures 3, 4, 5, 6:
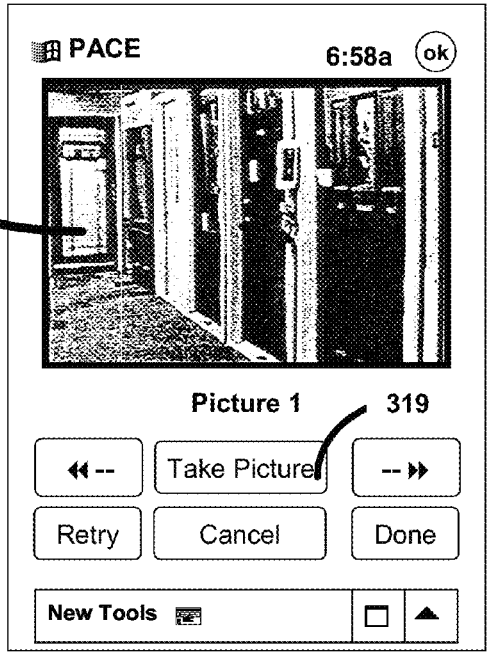
Figures 3, 4, 5, 6, 7:
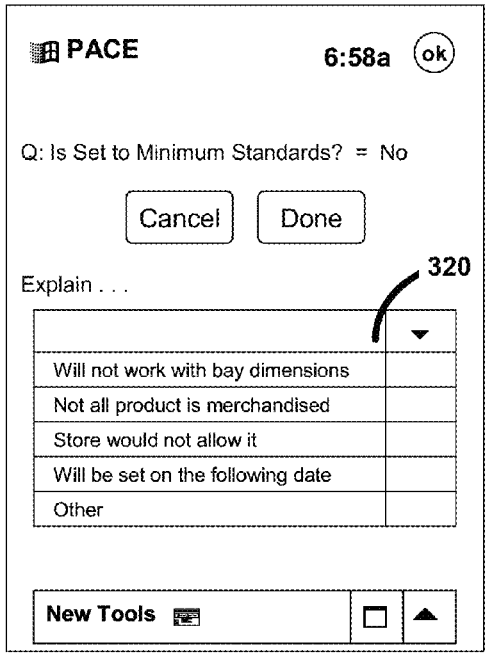
Figures 3, 4, 5, 6, 7, 8:
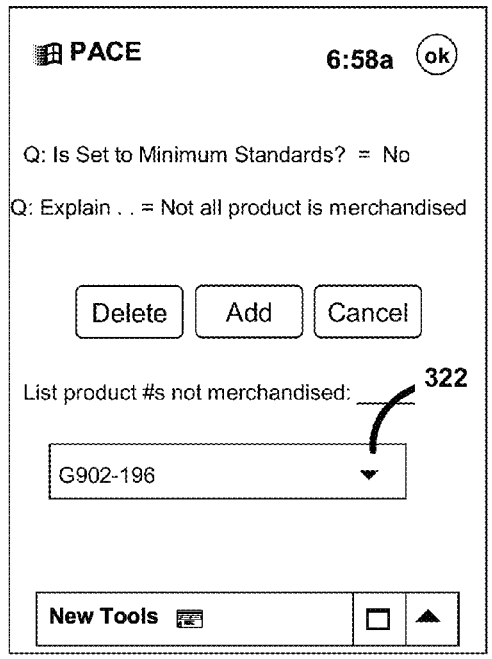
Figures 3, 4, 5, 6, 7, 8, 9:
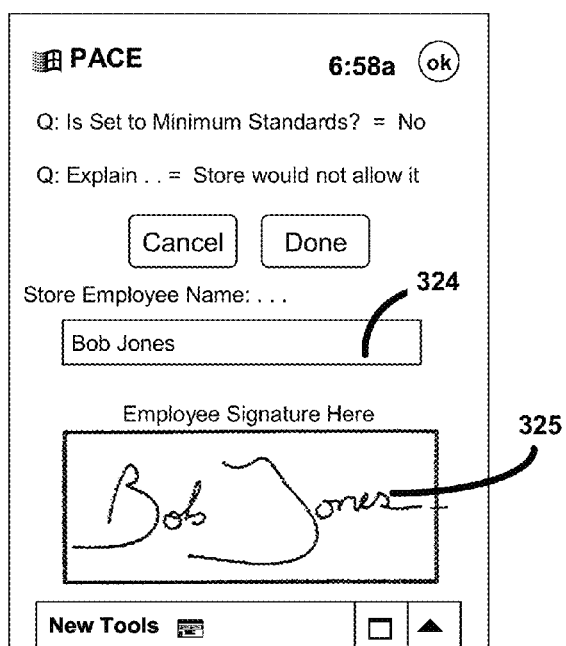
Figures 3, 4, 5, 6, 7, 8, 9, 10, 11, 12, 13, 14, 15, 16, 17, 18:
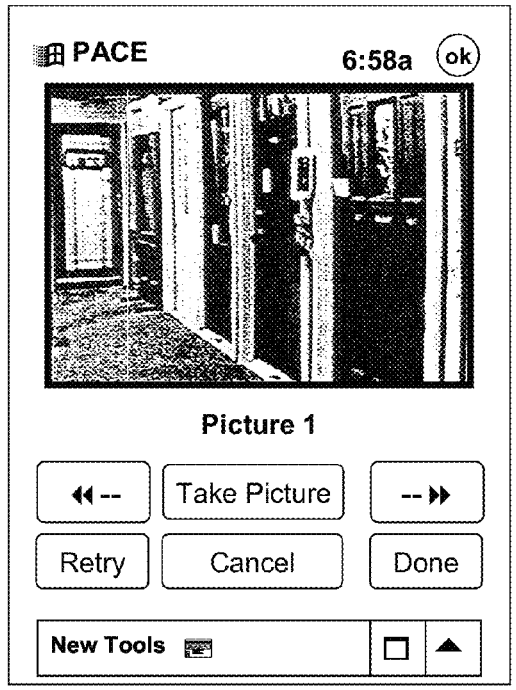
Figures 3, 4, 5, 6, 7, 8, 9, 10, 11, 12, 13, 14, 15, 16, 17, 18, 19:
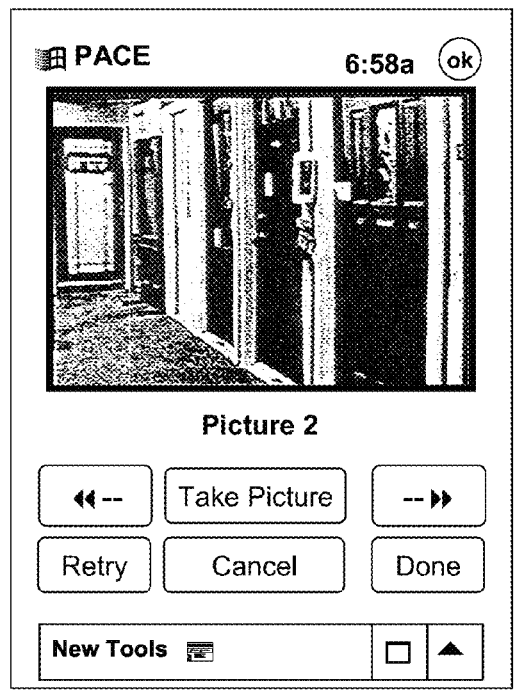
Figures 3, 4, 5, 6, 7, 8, 9, 10, 11, 12, 13, 14, 15, 16, 17, 18, 19, 20:
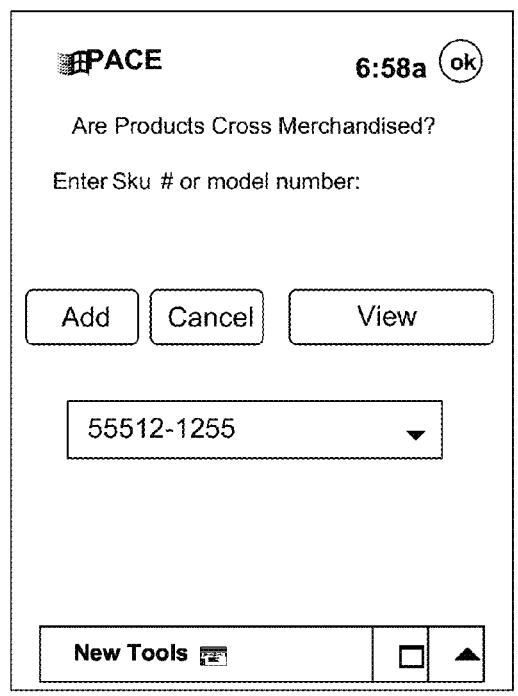
Figures 3, 4, 5, 6, 7, 8, 9, 10, 11, 12, 13, 14, 15, 16, 17, 18, 19, 20, 21:
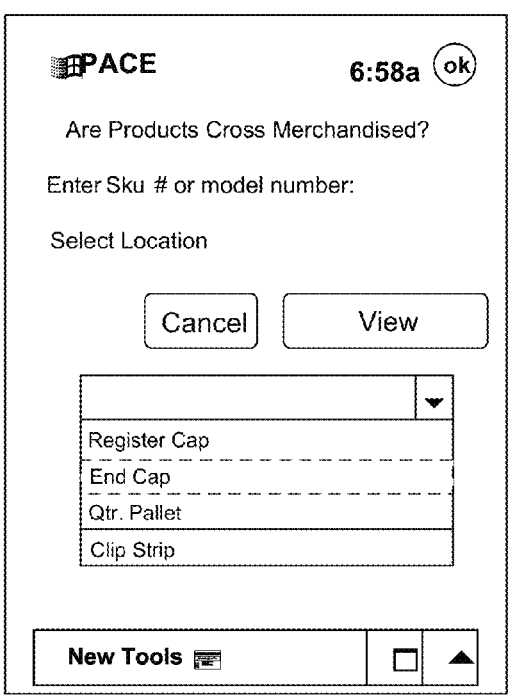
Figures 3, 4, 5, 6, 7, 8, 9, 10, 11, 12, 13, 14, 15, 16, 17, 18, 19, 20, 21, 22:
Figures 3, 4, 5, 6, 7, 8, 9, 10, 11, 12, 13, 14, 15, 16, 17, 18, 19, 20, 21, 22, 23:
Figures 3, 4, 5, 6, 7, 8, 9, 10, 11, 12, 13, 14, 15, 16, 17, 18, 19, 20, 21, 22, 23, 24:
Figures 3, 4, 5, 6, 7, 8, 9, 10, 11, 12, 13, 14, 15, 16, 17, 18, 19, 20, 21, 22, 23, 24, 25:
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
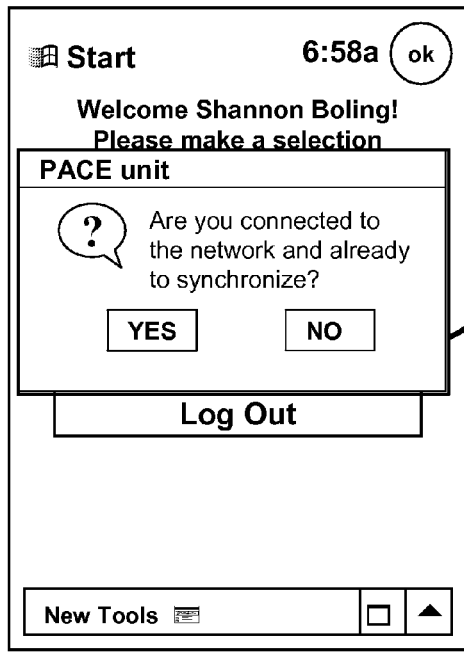
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43:
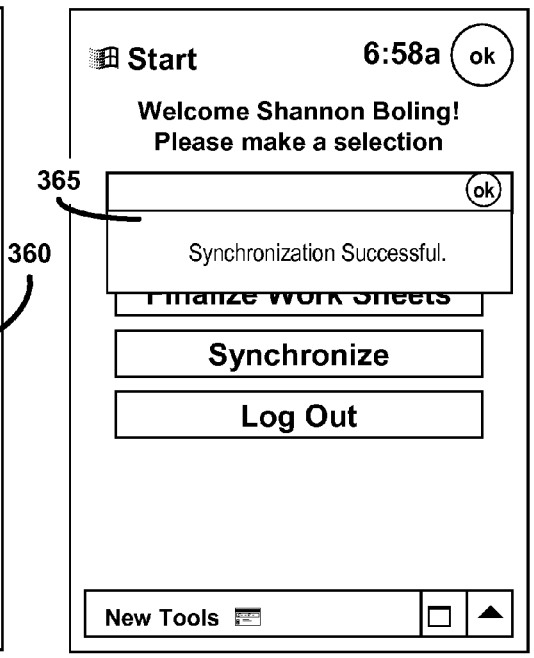
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
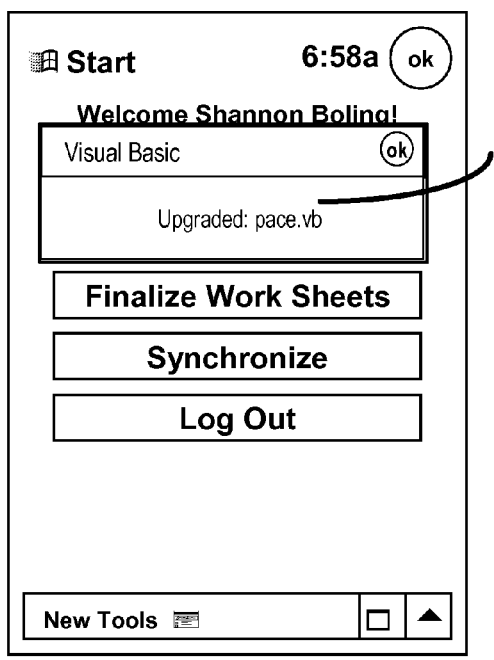
Figures 4, 5:
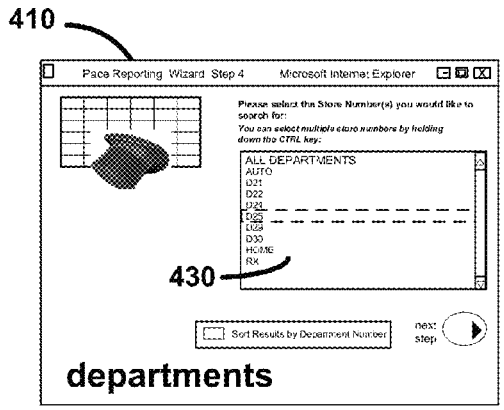
Figures 4, 5, 6:
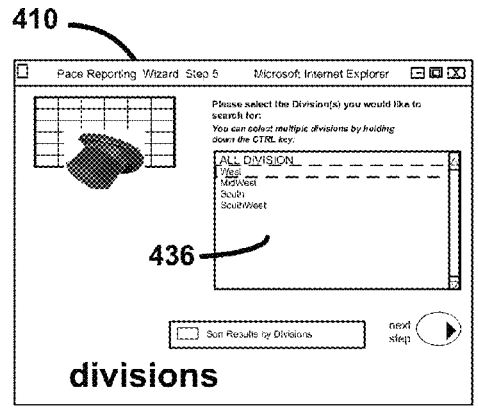
Figures 4, 5, 6, 7:
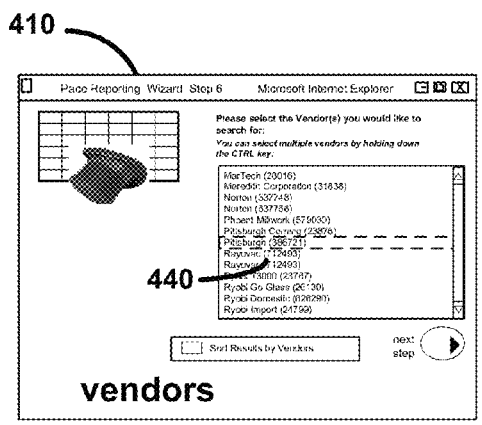
Figures 4, 5, 6, 7, 8:
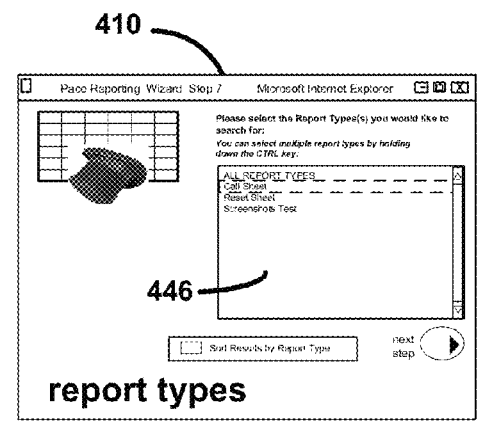
Figures 4, 5, 6, 7, 8, 9:
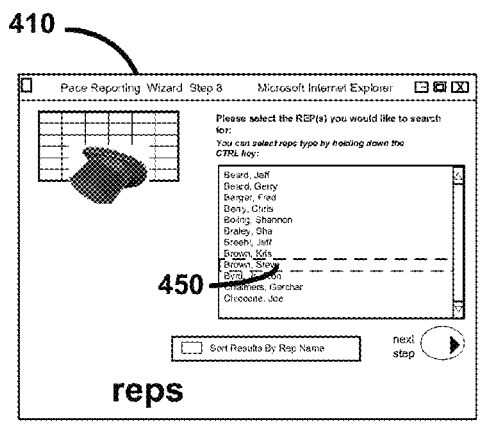
Figures 4, 5, 6, 7, 8, 9, 10:
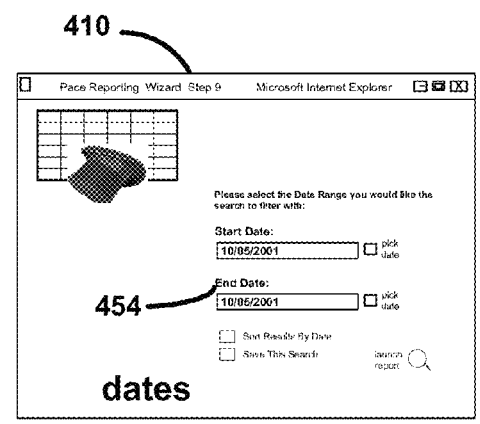
Figures 4, 5, 6, 7, 8, 9, 10, 11:
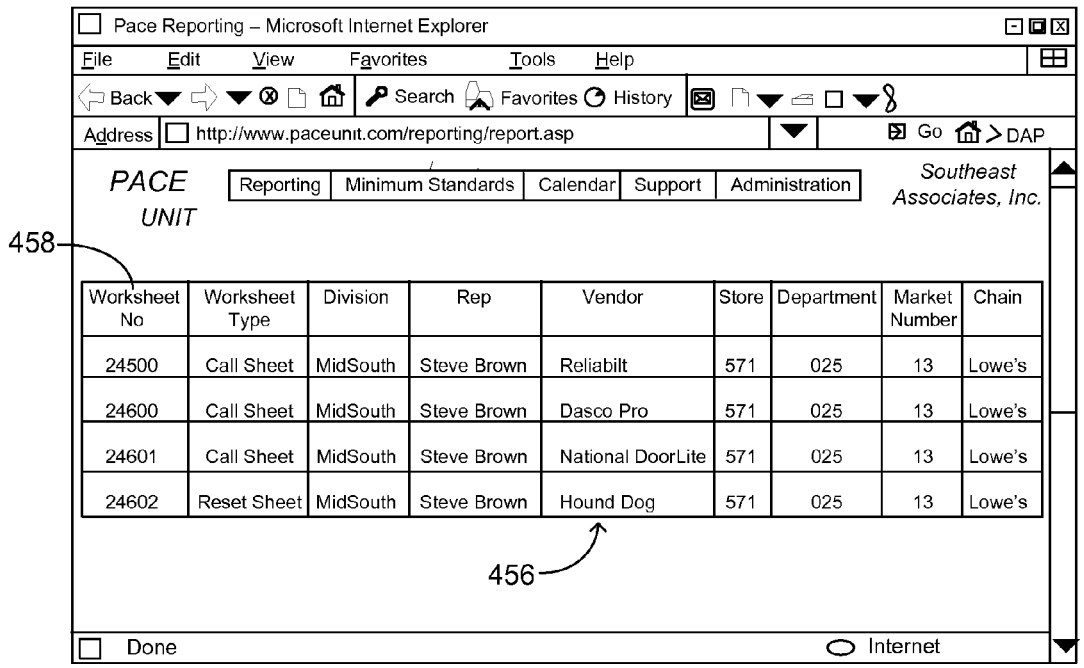
Figures 4, 5, 6, 7, 8, 9, 10, 11, 12:
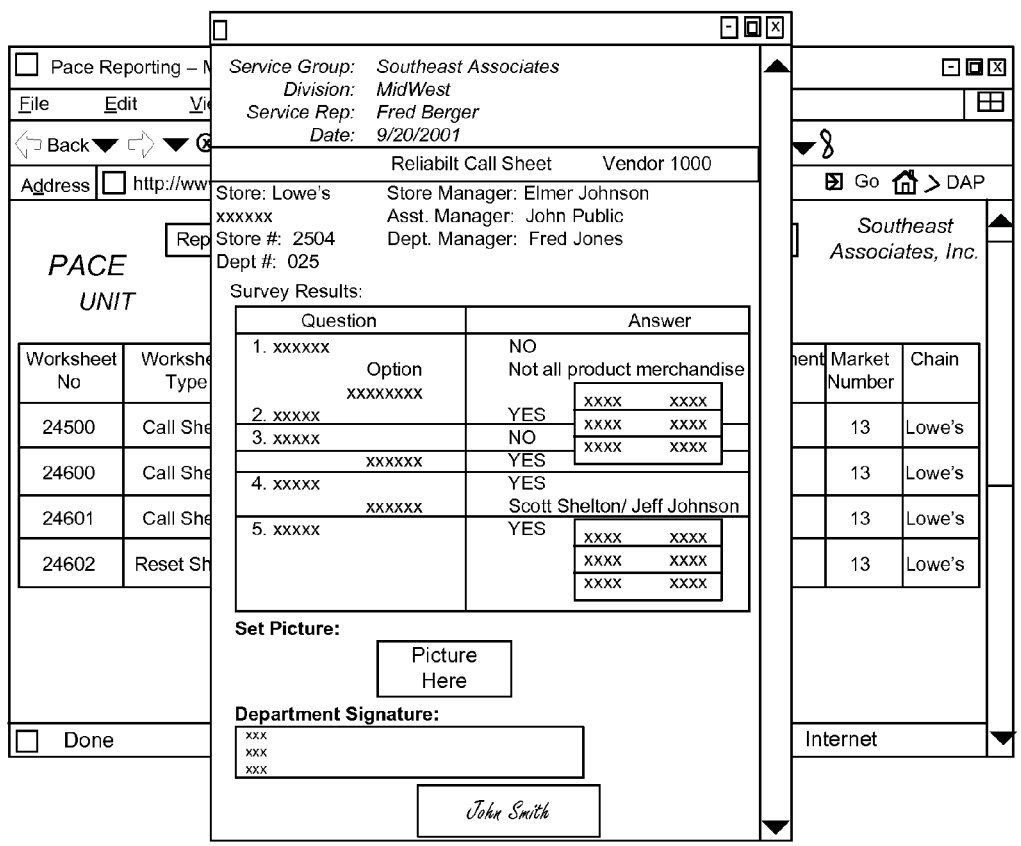

After all store information is entered, the user may be presented with the exemplary screen shown in FIG. 3-4, which is designed to guide the user through the process of identifying the vendor on behalf of whom the service call is made and selecting the task to be performed. A "Select Vendor" list 312 may be created and presented based on the previously supplied store identification information. Additional input fields may optionally be presented for specifying the department in which the service call will take place and the manager of that department. A "Sheet Type" list 313 may present the user with worksheet choices. Each worksheet will include surveys and/or task instructions that are to be performed during the service call. In this example, a "Call Sheet" is a worksheet that is used during a basic service call; a "Reset Worksheet" is a worksheet that is used during a reset or when a display or presentation of a product is changed or reworked; a "Pk Sheet" is a worksheet that is used during a "Product Knowledge" or training session; a "RTV Sheet" is a worksheet used when product is to be "Returned to Vendor." These and other worksheet options may be presented to the user by way of the Sheet Type list 313. By way of example only, other worksheet options may include, but are not limited to, a cross-merchandising work-sheet for identifying cross-selling or up-selling relationships/opportunities between products and a point-of-purchases (POP) ordering worksheet for ordering POP items such as signage, samples, coupon and other displays. For the sake of the present example, it will be assumed that a Call Sheet is the first worksheet selected by the user.

After selecting to proceed with a Call Sheet, the user may be presented with the display shown in FIG. 3-5. The "Camera" icon 315 provides the user with the option to record, preview and store a picture of the "set" (i.e., product display area) prior to performing any other tasks during the service call. In addition, the display may include question areas 316, 317 which ask the user to record whether the state of the set appears to comply with a determined set of minimum standards and whether POP signage or other items are "up" or properly displayed. Other question areas, to present additional questions to the user, may be included if desired. If the user selects the camera icon 315, the display screen of FIG. 3-6 may be presented and the camera 115 may be activated. Activating the camera 115 causes the display screen to present a digital image 318 of the set, or whatever else may be within the field of the camera lens. A "Take Picture" button 319 may be activated in order to instruct the camera 115 to record the digital image 318. Multiple pictures may be recorded, limited only by the physical memory and/or processing limitations of the handheld device 105.

After taking a pre-service picture of the set, the user may again be presented with the display screen of FIG. 3-5. Many of the question presented to the user by the worksheet will include follow-up questions. The particular follow-up questions to be presented may depend on the answers given by the user to the prior questions. For example, in responding to the question displayed in question area 316, the user may indicate that the set is or is not to minimum standards. If the user input indicates that the set is not to minimum standards, the display screen of FIG. 3-7 may be used to provide a follow-up question. The display screen of FIG. 3-7 includes an "Explain" list 320 which presents a number of possible reasons why the set may not comply with minimum standards. Selection of one of the listed explanations in Explain list 320 may complete this portion of the survey, or may trigger the display of additional follow-up questions.

For example, the user may indicate (FIG. 3-7) that the reason for non-compliance with minimum standards is that "not all product is merchandised." If such a reason is selected by the user, the display screen of FIG. 3-8 may be displayed, which may include a "List product #'s not merchandised" list 322 that allows the user to select non-merchandised product numbers. As another example, the user may indicate (FIG. 3-7) that the reason for non-compliance with minimum standards is that the "store would not allow it." If such a reason is selected, the display screen of FIG. 3-9 may be presented, which includes a "Store Employee Name" input filed 324 and an "Employee Signature" input field 325, so that the user can record the name and signature if the store employee who would not allow the set to comply with minimum standards. As a further example, the user may indicate (FIG. 3-7) that the set "will be set [to minimum standards] on the following date." If such an explanation is selected, the display screen of FIG. 3-10 may be presented, which includes an "Enter Date" input field 326.

Returning to FIG. 3-7, the worksheet may also inquire as to whether the "POP is up." If the user indicates that POP is not up, the display screen of FIG. 3-11 may be presented, which includes an "Explain" list 328. Depending on the explanation selected from the Explain list 328, additional questions may be displayed to the user. As shown in FIG. 3-12 and FIG. 3-13, the user may also be presented with display screens for ordering POP items. POP order forms can be sent to the server 130 during synchronization and/or can be transmitted directly from the handheld device 105 to the POP item manufacturer at any time.

After completing all of the questions on the display screen of FIG. 3-7 and all related display screens that are presented in response to certain answers to those questions, the user may be presented with a next phase of the survey. By way of example, the next phase of the survey may involve the questions shown in the display screen of FIG. 3-14. This new set of questions provides the user with the opportunity to indicate the date of the last 'beam label,' the size of the set and whether all current units are on display. Again, additional related screen displays may be presented depending on the responses input by the user to the questions in FIG. 3-14. Examples of such related display screens are shown in FIG. 3-15 and FIG. 3-16.

The exemplary display screen of FIG. 3-17 shows another phase of a survey that may be presented to the user. In this phase, the user is provide with the opportunity to take another picture of the set, indicate whether products are cross-merchandised and indicate whether the user would like to add any comments. Related screen displays that may be presented depending on the responses input by the user to the questions in FIG. 3-17 are shown in FIG. 3-18 through FIG. 3-26.

In the exemplary screen display shown in FIG. 3-27, the user is provided the opportunity to estimate the time spent servicing the vendor during the service call. This time estimation may be useful to management (service representative agency, vendor and/or retailer) in assessing the accountability of the service representative. As mentioned, the handheld device 105 may be configured to record the times at which the service agent enters/exits the retail center 150 and/or begins/completes a worksheet. These time recordings may be compared with the service representative's time estimations. Thus, in the reporting phase (see FIG. 4), management may be able to account for virtually every minute of the service representative's service call(s). When all required responses are provided by the user, a "Call Sheet Complete" message 350 may be displayed, as shown by way of example in FIG. 3-28. In the example of FIG. 3-28, the user may either acknowledge that the call sheet is complete, or may indicate that the call sheet is not complete. By indicating that the call sheet is not complete, the user may again be provided with control to scroll back through the display screens (e.g., using "previous" and "next" interface controls) in order to review and/or revise any of the inputted data.

Referring again to FIG. 3-4, the user may also select "RTV" (a.k.a. Return to Vendor) from the Sheet Type list 313. When initiating an RTV worksheet, the user may again specify the department (e.g., RTV) and a department manager (e.g., RTV manager). As shown in FIG. 3-29, a confirmation dialog 352 may be displayed to ask the user whether the RTV manager is still the department manager. Confirmation dialogs may be used in connection with any interface displayed by the handheld device 105 in order to ask the user to verify a response or to indicate a success or failure of an automatic verification of a user response.

An exemplary RTV survey is shown in FIG. 3-30 through FIG. 3-32. Similar to a Call Sheet survey, an RTV survey may involve a number of display screens that present initial questions and/or instructions to the user. Related display screens may be displayed to present follow-up questions or instructions to the user depending on the user's responses to the initial questions/instructions. The user may also be asked to estimate the amount of time spent servicing the vendor during the RTV process.

When the RTV worksheet is complete, the handheld device 105 may again present the display screen of FIG. 3-4. As another option, the user may select "PK" (a.k.a. Product Knowledge) from the Sheet Type list 313. Initiation of a PK worksheet may lead to the sequence of exemplary screen displays shown in FIG. 3-33 through FIG. 3-36. Those skilled in the art will appreciate that the exemplary Call Sheet, RTV and PK worksheets were provided by way of example only. These exemplary worksheets may be modified in other embodiments and/or may be provided with different user interfaces. Additional and/or alternative worksheet types may be presented as well. When all worksheets are completed to the user's satisfaction, the user may instruct the handheld device 105 to return to the main menu of FIG. 3-2.

From the menu of FIG. 3-2, the user may select the Finalize Worksheets icon 305 in order to initiate a final review of all completed worksheets. Exemplary screen displays that may be presented to the user during a final review of the worksheets are shown in FIG. 3-37 through FIG. 3-39. As shown in FIG. 3-39, the user may have the opportunity (or be required) to attach signatures of one or more managers to the completed worksheets. Drop-down lists can be provided to list the departments and managers that were previously specified by the user in the worksheets. A stylus or other pointing device 113 may be used by the manager to input his or her signature into the handheld device 105. Other methods for capturing handwritten signatures may be employed as well, such as the use of a digital scanner, a digital camera 115, etc. Additionally and/or alternatively, non-handwritten electronic signatures, digital certificates or biometrics (e.g., fingerprints, retinal scans, etc.) may be utilized. Any signatures that are input to the handheld device 105 are attached to the appropriate worksheet(s).

After all worksheets have been finalized, the user may synchronize the handheld device 105 with the server 130. The handheld device may be synchronized in any suitable fashion, using any appropriate communication hardware, software and protocol(s). Shown by way of example only in FIG. 3-40, the user may activate a communication software module (IP-ASS PDA, in this example) in order to initiate the synchronization process. The communication software may be part of or separate from the software that manages the service call surveys. As shown in FIG. 3-41, the user may interact with the communication software to input information needed to make a connection with the server 130. Again, the connection may be established via a network 120 or a dedicated communications link, using nay suitable communication device, such as a modem, network interface card, etc.

After activating and configuring the communications software, the user may select the Synchronize icon 306 from the menu of FIG. 3-2. Upon selecting the Synchronize icon 306, a Connection Confirmation dialog 360 may be displayed as shown in FIG. 3-42. The user may verify that a connection with the server 130 is established and then wait for the handheld device 105 to be synchronized with the server 130. As previously mentioned, synchronization may involve transmitting data from the handheld device 105 to the server 130 and/or transmitting data (updates surveys, instructions, software and/or messages, etc.) from the server 130 to the handheld device 105. A Synchronization Confirmation dialog 365 may be presented upon completion of the synchronization, as shown in FIG. 3-43. An Update Confirmation dialog 367 may optionally be displayed, as shown in FIG. 3-44, to inform the user about any updates or messages that were sent to the handheld device 105 during the synchronization.

Those skilled in the art will appreciate that any file synchronization protocol may be used to synchronize the handheld device 105 with the server 130. For example, a common file synchronization protocol suitable for the present invention is the Merge Replication protocol developed by Microsoft Corporation. Merge Replication is a protocol for distributing data from a publisher (server 130) to a subscriber (handheld device 105), allowing the publisher and subscriber to make updates while connected or disconnected, and then merging the updates between sites when they are connected. Merge Replication and other common file synchronization protocol, while adequate for use in certain embodiments, often result in lengthy synchronization times. Accordingly, in certain embodiments, a proprietary file synchronization protocol may be employed.

As an example, the present invention contemplates a proprietary file synchronization protocol referred to herein as "Red Rover." According to the Red Rover protocol, uploads from a handheld device 105 to the server 130 are meant to be "fast and dumb." The handheld device 105 connects to the server 130, uploads its files to a queue and then disconnected from the server 130 without awaiting an acknowledgement that the files were received in tact and successfully stored in the appropriate database. Off-line, the server 130 processes the queued files and moves them to the appropriate database(s) for storage. Any files received in tact from the handheld device 105 are added to a list maintained by the server 130. The list may be specific to the handheld device 105 (e.g., identified by handheld ID) and may record the date and time of reception for each file.

To further facilitate a rapid upload process, the Red Rover protocol specifies that each handheld device maintain an index of files to be uploaded to the server 130. The index is transmitted to the server 130 during the initial synchronization request. The server 130 parses the index received from the handheld device 105 and cross-references each indexed file against its list of files received from the handheld device 105. The server 130 then instructs the handheld device 105 to upload only those indexed files that have not been previously received and/or not received within a certain timeframe by the server 130.

According to the Red Rover protocol, files downloaded from the server 130 to the handheld device 105 are staged in advance of the file synchronization request. Files may be associated with particular handheld devices 105, particular groups of service representatives, particular vendors, particular retail centers 150, etc., by assigning unique identifiers to any such entities. When a file synchronization request is received at the server 130 from a handheld device 105, the server 130 may detect one or more identifiers and transmit any files associated with the identifier(s) to the handheld device 105. A hierarchy of priorities for each type of identifier (e.g., handheld device ID, group ID, etc.) may be established so that file downloads may be managed at the device level and/or at the group level. A determination as to whether to download a file to a handheld device 105 may be based on the "last change" date of the file and/or the date the file was last sent to the handheld device 105. Of course, such dates may be ignored in an appropriate case and all files associated with the identifier(s) of the handheld device 105 may be downloaded.

Whatever file synchronization protocol is employed, data that is transmitted from the handheld device 105 to the server 130 may be stored in a database 135 at or connected to the server 130. The database 135 may be secured using password protection, data encryption and/or any other suitable security technique. The data stored in the database 135 and may be queried by a reporting module 132, which preferably includes functionally to enable the creation of customized reports. The reporting module 132 may be executed at the server 130 or at other devices on the network 120, such a vendor device 160, a service representative agency device 145 or a retailer device 155. In a preferred embodiment of the invention, the reporting module 132 is hosted at the server 130 and is accessed by other network devices via a web-interface or other suitable interface.

An exemplary web-interface for a reporting module 132 is shown in FIG. 4, comprising FIG. 4-1 through FIG. 4-18. As shown in FIG. 4-1, access to the reporting module 132 may be guarded by a login interface 405 that requires a user to supply a valid username and password. Authentication of the supplied username and password may be performed at the server 130 or at any other suitable location. Once the user is granted permission to utilize the reporting module 132, the exemplary web-interface of FIG. 4-2 may be presented. A report wizard initiator 409 may be displayed to initiate a report wizard 410. As is known in the art, a 'wizard' is a pre-defined sequence of interfaces that prompt the user for input. Based on the user input, a result will be generated by the wizard. Thus, the report wizard 410 presents a sequence of interfaces that prompt the user for input that will be used to automatically generate a report regarding service calls. For example, the report wizard 410 may begin with a "Chain Selection" interface 412, through which the user is prompted to select the retail chain that will be the subject of the report. As shown in FIG. 4-3, the report wizard 410 may next present a "Market Number Selection" interface 418, which allows the user to confine the report to one or more specific markets. The report wizard 410 may also display a "Store Number Selection" interface 424 (FIG. 4-4), a "Department Number Selection" interface 430 (FIG. 4-5), a "Division Selection" interface 436 (FIG. 4-6), a "Vendor Selection" interface 440 (FIG. 4-7), a "Worksheet Type Selection" interface 446 (FIG. 4-8), a "Rep. Selection" interface 450 (FIG. 4-9) and a "Date Range" interface 454 (FIG. 4-10) in order to define the scope of the report.

FIG. 4-11 shows a web-interface that presents a Rep Activity report 456 generated by the report wizard 410. The Rep Activity report 456 presents a list of worksheets that were submitted by the specified representative(s) during the specified date range and according to the other report criteria designated by the user. The user is able to click on one of the worksheet numbers 458 in order to trigger a display of the corresponding worksheet. As shown in FIGS. 4-12 and 4-13, the actual worksheet may be reproduced for review by the user. Any digital images and signatures that were captured by the service representative during the service call are attached to the report worksheet. Image viewer functionality may be provided by the call module (or otherwise by other software, such as the user's web browser) to allow the user to view the worksheet images in full color and to adjust their position, scale, etc., as desired.

As shown in FIG. 4-14, the Rep Activity report 456 is but one type of report that may be generated by the report module 132. A Vendor Activity report 460 may present all activity that a service representative agency has performed on behalf of one or more vendors during a given time period. Examples of a Vendor Activity report 460 are shown in FIG. 4-15 through 4-17. Other types of reports include, but are not limited to, a Rep Group Listings Report 462 and an Exception Report 464. An example of an Exception report 464, showing all retail location not serviced by a service representative during a particular time period, is illustrated in FIG. 4-18.

In addition to the interface for the reporting module, the server 130 may also provide one or more interface to allow authorized users to manage schedules and notifications for each handheld device 105 and/or groups of handheld devices 105. For example, the server 130 may execute a Scheduling/Notification module 133 that includes calendar and email functionality. In addition, each handheld device 105 may execute local calendar and email applications. Calendar data can be synchronized between the server 130 and each handheld device 105. Notifications can be emailed to handheld devices 105 ad hoc or according to pre-determined schedules. Software and worksheet updates can also be downloaded to handheld devices according at scheduled times.

In certain embodiments, the Scheduling/Notification module 133 module may be configured to interact with the Reporting module 132. In this manner, an authorized user may specify a schedule according to which custom reports are to be automatically generated. For example, at a scheduled time the Reporting module 132 may be instructed to search for all or selected worksheets that meet certain criteria (e.g., worksheet type, question type, answer type, etc.) and to generate a report summarizing such worksheets. The authorized user may specify the report date and criteria through the scheduling interface.

As previously mentioned, worksheets executed by a handheld device 105 may be custom designed by a particular service representative group, vendor and/or retailer. The server 130 may execute a Worksheet Management module 134 that allows authorized users to create, revise and manage worksheets. Again, the user interface for the Worksheet Management module 134 may be a web-based interface or any other suitable interface. Custom designed worksheets allow specific retailer, vendor and/or service agency needs to be satisfied during a service call.

In certain embodiments of the present invention, worksheets are constructed using a component-based model. Pre-determined worksheet questions and instructions are treated as unique components, each assigned a unique identifier. The worksheet designer is thus provided with a list (database) of re-usable worksheet questions and instructions to choose from. If the designer elects to create a new worksheet question or instruction, the new question or instruction may be assigned a unique identifier and added to the list of re-usable questions and instructions. To the extent possible worksheet questions and instructions are phrased using simple, standard language, so as to avoid having multiple components that call for the same user response. Optionally, if the designer insists on using particular language that would result in a component that calls for the same user response as a previously stored component, the designer's "new" component may be assigned the same identifier that was assigned to the previously stored component.

The component-based model for the design of worksheets greatly enhances the flexibility of the Reporting module 130. Reports can be run based on any component (i.e., worksheet question or instruction) that is common across multiple worksheets. Cross-vendor, cross-retailer and cross-service agency reports are possible when worksheets designed for particular vendors, retailers or service agencies include common components. As one example, a particular retailer may specify certain "master service requirements" and dictate that any worksheets used within its retail centers 150 include certain components. The retailer can then generate reports based on those components to determine whether its master service requirements have been met in each retail center 150. Deficient service can thus be pinpointed to a regional level, store level, service agency level and/or service representative level.

As another tool for assisting retailer, vendors and service agencies in determining whether particular service levels are met, the present invention may incorporate a predictive rating system where revenue/performance may be predicted based on service patterns and those service attributes tracked and managed by the server 130. Data may be scored at the store level, service agency level, individual service representative level, and/or at the vendor level to analyze the effectiveness of the service representatives. An exemplary scoring model contemplated herein begins with a sheet complexity index ("SCI") assigned to each worksheet presented to a service representative. An SCI value may be determined based on the composition and relative complexity of the worksheet. SCI values may indicate the level of work required to be performed by the service representative to complete the worksheet.

The composition of a worksheet may be described as follows: each worksheet has a "sheet type" (e.g., Call Sheet, RTV, PK, Cross-Merchandising, etc); each worksheet includes one or more tasks; each task includes one or more questions (or instructions); each question has a type; the user's responses to certain questions may trigger the need for an activity and each activity has a type. Given this framework, the composition of a given worksheet can be quantified. Weighted values can be assigned to selected elements of a worksheet, such as sheet type, questions types and activity types. SCI values may then be determined based on such weighted values. The manner in which SCI values are calculated is not necessarily important; what matters is that worksheet complexity is rated in comparison to other worksheets.

By way of example and not limitation, a SCI value for a worksheet may be calculated by summing the total number of tasks in the worksheet, the total number of question in the worksheet and the average number questions per task. Added to this sum may be a question type value, a sheet type value and an activity type value. The question type value may be the sum of weighed question type values for all questions in the worksheet. The sheet type value may be the weighted value for the sheet type of the worksheet. The activity type value may be the sum of weighted activity type values for all activities triggered by the worksheet.

Each individual service representative may be rated based on a plurality of data points. As an example, such data points may include: total worksheet time (accumulated hours consumed by completing worksheets), total time in stores, number of distinct stores visited, number of service calls made, attendance times (earliest/latest/average arrival and departure times), number of discreet worksheets completed, number of worksheets completed per service call, average SCI value for all completed worksheets, average time per service call, average time per store, average time per worksheet. These and/or other data points may be tracked for each service representative over a given period of time. These data points could be quantified and weighted so as to assign a rating to the performance of a service representative. Service representative ratings could then be combined and examined at the store level, retailer level, vendor level and/or service agency level in order to determine whether service requirements are being met at each level.

From a reading of the description above pertaining to various exemplary embodiments, many other modifications, features, embodiments and operating environments of the present invention will become evident to those of skill in the art. For example, those skilled in the art will appreciate that present invention may be extended to a wireless web environment, in which worksheets are designed as web-pages that are downloaded to a browser executed by a handheld device 105. Those skilled in the art will further appreciate that the principles of the present invention may be applied to other field force automation scenarios and are not limited to scenarios involving service representation in big box retail environments. It should be understood, therefore, that the foregoing relates only to certain exemplary embodiments of the invention, and that numerous changes and additions may be made thereto without departing from the spirit and scope of the invention as defined by any appended claims. The features and aspects of the present invention described or depicted herein are not intended to be interpreted as required or essential elements of the invention unless explicitly stated as such.

What is claimed is:

1. A system for providing service representation for a vendor comprising:
   a handheld device configured for displaying a sequence of prompts from a worksheet, and for receiving user input in response to said prompts, said user input comprising data from the worksheet collected during a service call at a retail location, each worksheet comprising a survey that includes sequence of instructions and questions about one or more products of the vendor sold at the retail location that guide a service representative through a service call at the retail location, the handheld device comprises a digital camera device for recording digital images during the service call, the digital images corresponding to answers of questions provided in the survey, the handheld device further comprises a bar code scanner device for scanning bar codes during the service call;
   a server in communication with said handheld device via a network, said server configured for receiving the data from the handheld device and storing the data in a database;
   a beacon provided at the retail location that emits a first signal encoded with a retail center identifier and the current date and time, wherein the handheld device is configured with a receiver for receiving the first signal upon entry into the retail location, the handheld device automatically records and associates the retail center identifier and the current date and time with the worksheet on the handheld device in response to detecting the first signal and in response to the handheld device being physically located within the retail location having the beacon, the beacon emitting a second signal that is received by the handheld device upon exiting the retail location, the second signal causing the handheld device to display a message asking if the service representative is ready to synchronize the data from the worksheet with the server and if a communication link exists between the handheld device and the server, the second signal comprising the current date and time which is associated by the handheld device with the worksheet to indicate a completion time and date for the worksheet, the beacon preventing tampering of the data in the worksheet from the service representative by emitting the first and second signals for supplying accurate time, date, and retail location which are associated with the completed worksheet
   a network device in communication with said server via the network, said network device configured for interacting with a reporting module for querying the database and for generating a report based on the data;
   wherein the service call comprises multiple tasks;
   wherein the handheld device is further configured to record as data the times at which the service representative begins and completes the service call; and
   wherein the handheld device is further configured to record as data the times at which the service representative begins and completes each task during the service call.

2. The system of claim 1, wherein the reporting module is hosted by the server and is accessed via the network by the network device.

3. The system of claim 1, wherein the reporting module is executed locally by the network device.

4. The system of claim 1, wherein the server stores uploaded data in the database that is queried by a reporting module in order to generate reports; and wherein said reporting module is hosted by the server and is accessed via a network by a network device.

5. A method for field force automation in a retail environment comprising:
- providing a plurality of computer-implemented worksheets, each worksheet comprising a survey that includes sequence of instructions and questions about one or more products of the vendor sold at retail centers that are intended to guide service representatives through service calls in the retail centers;
- storing said worksheets at a server;
- downloading said worksheets from the server to a plurality of handheld devices operated by the service representatives, wherein each service representative enters a plurality of retail centers to perform the service calls while interacting with selected ones of the worksheets, each handheld device comprising a digital camera device for recording digital images during a service call, the digital images corresponding to answers of questions provided in the survey, each handheld device further comprising a bar code scanner device for scanning bar codes during a service call;
- receiving data with each handheld device based on a respective service representative interacting with a worksheet;
- providing each retail center with a beacon that emits a first signal encoded with a retail center identifier and the current date and time;
- configuring each handheld device with a receiver for receiving the first signal upon entry into a retail center;
- automatically recording and associating the retail center identifier and the current date and time with a worksheet on each handheld device in response to detecting the first signal and in response to the handheld device being physically located within a retail center having the beacon;
- emitting a second signal with the beacon that is received by each handheld device upon exiting a retail location, the second signal comprising the current date and time which is associated by the handheld device with the worksheet to indicate a completion time and date for the worksheet;
- in response to receiving the second signal, each handheld device displaying a message asking if the service representative is ready to synchronize data from a worksheet with the server and if a communication link exists between the handheld device and the server, the beacon preventing tampering of the data in the worksheet from the service representative by emitting the first and second signals for supplying accurate time, date, and retail location which are associated with a completed worksheet;
- receiving the data input to the handheld devices at the server for storage in a database; and
- querying the database to generate a report that indicates the service levels provided by the service representatives.

6. The method of claim 5, wherein the data input to the handheld devices includes digital signatures of retail associates.

7. The method of claim 5, wherein the signal comprises an infrared signal.

8. The method of claim 5, wherein providing said worksheets comprises selecting a plurality of questions and instructions from a database of re-usable questions and instructions, each re-usable question and instruction identified by a unique identifier.

9. The method of claim 5, further comprising the steps of assigning a relative complexity rating to each worksheet that is used to evaluate the level of effort required by the services representatives to complete the worksheet.

10. A method for field force automation in a retail environment comprising:
- configuring a handheld device with a receiver;
- receiving at the handheld device a plurality of worksheets each comprising a survey that includes sequence of instructions and questions related to one or more tasks to be performed in a retail center during a service call, each handheld device comprising a digital camera device for recording digital images during a service call, the digital images corresponding to answers of questions provided in the survey, each handheld device further comprising a bar code scanner device for scanning bar codes during a service call;
- providing a retail center with a beacon;
- emitting a first signal with the beacon that is encoded with a retail center identifier and the current date and time;
- receiving the first signal with the receiver upon entry into the retail center;
- initiating the service call at the retail center by executing a selected worksheet with the handheld device, and automatically recording and associating the current date and time and a retail center identifier from the first signal with the selected worksheet by the handheld device in response to the handheld device being physically located within a retail center having the beacon;
- receiving data with the handheld device that is in response to the sequence of instructions and questions of the selected worksheet in order to input data relating to products of a vendor sold at the retail center into the handheld device;
- obtaining at least one digital signature with the handheld device from an associate of the retail center to indicate that the service call is complete;
- emitting a second signal with the beacon that is received by each handheld device upon exiting a retail location, the second signal comprising the current date and time which is associated by the handheld device with the worksheet to indicate a completion time and date for the worksheet;
- in response to receiving the second signal, each handheld device displaying a message asking if the service representative is ready to synchronize data from a worksheet with the server and if a communication link exists between the handheld device and the server, the beacon preventing tampering of the data in the worksheet from the service representative by emitting the first and second signals for supplying accurate time, date, and retail location which are associated with the completed worksheet;
- uploading the data from the handheld device to a secure server; and
- wherein the service call comprises multiple tasks executed by the handheld device; and further comprising the step of recording as data with the handheld device the times at which the service representative begins and completes each task during the service call.

* * * * *